United States Patent
Edsberg

(10) Patent No.: US 8,027,318 B2
(45) Date of Patent: Sep. 27, 2011

(54) METHOD, APPARATUS AND SYSTEM FOR RAPID ACQUISITION OF REMOTE NODES IN A COMMUNICATION SYSTEM

(75) Inventor: David Edsberg, Eagle Mountain, UT (US)

(73) Assignee: VT Idirect, Inc., Herndon, VA (US)

( * ) Notice: Subject to any disclaimer, the term of this patent is extended or adjusted under 35 U.S.C. 154(b) by 1071 days.

(21) Appl. No.: 10/584,054

(22) PCT Filed: Jun. 29, 2005

(86) PCT No.: PCT/US2005/023721
§ 371 (c)(1),
(2), (4) Date: Aug. 6, 2007

(87) PCT Pub. No.: WO2006/005048
PCT Pub. Date: Jan. 12, 2006

(65) Prior Publication Data
US 2007/0276955 A1    Nov. 29, 2007

Related U.S. Application Data

(60) Provisional application No. 60/583,790, filed on Jun. 30, 2004.

(51) Int. Cl.
*H04W 4/00* (2009.01)
(52) U.S. Cl. .................. 370/338; 370/316
(58) Field of Classification Search .......... 370/316, 370/319, 321, 328, 338, 344; 455/12.1, 13.2; 709/237
See application file for complete search history.

(56) References Cited

U.S. PATENT DOCUMENTS

| | | | |
|---|---|---|---|
| 4,313,205 A | 1/1982 | Rhodes | |
| 4,712,212 A | 12/1987 | Takai et al. | |
| 5,180,932 A | 1/1993 | Bengel | |
| 5,237,592 A | 8/1993 | Nonami | |
| 5,278,832 A | 1/1994 | Binzel et al. | |
| 5,798,732 A | 8/1998 | Eshenbach | |
| 5,912,656 A | 6/1999 | Tham et al. | |
| 5,963,166 A | 10/1999 | Kamel | |
| 6,298,048 B1 | 10/2001 | Lamkin et al. | |
| 6,298,227 B1* | 10/2001 | Molnar | 455/323 |
| 6,411,662 B1* | 6/2002 | Sakoda et al. | 375/340 |
| 6,430,394 B1 | 8/2002 | Boyden | |
| 2003/0139152 A1* | 7/2003 | Doi et al. | 455/101 |
| 2004/0136334 A1* | 7/2004 | Heiman et al. | 370/316 |
| 2005/0085249 A1* | 4/2005 | Goldstein et al. | 455/502 |
| 2005/0157734 A1* | 7/2005 | Li et al. | 370/406 |
| 2005/0270999 A1* | 12/2005 | Schiff et al. | 370/318 |

FOREIGN PATENT DOCUMENTS

WO    02 073849    9/2002

* cited by examiner

*Primary Examiner* — Ricky Ngo
*Assistant Examiner* — Kan Yuen
(74) *Attorney, Agent, or Firm* — Oblon, Spivak, McClelland, Maier & Neustadt, L.L.P.

(57) ABSTRACT

A method of acquiring a remote node in a communication network includes sending a first acquisition command from a hub to the remote that instructs the remote to send an acquisition response and includes a first frequency (S100). The method also includes sending a first acquisition response based on the first acquisition command from the remote to the hub using the first frequency (S106) and sending a second acquisition command from the hub before receiving the first acquisition response at the hub (S102). A related method of acquiring a remote node in a synchronous communication network and a related hub apparatus, remote apparatus, computer program product and system each include similar features.

45 Claims, 13 Drawing Sheets

| Remote ID 1 | Frequency Offset | Time Offset | Assigned Slot(s) |
|---|---|---|---|
| Remote ID 2 | Frequency Offset | Time Offset | Assigned Slot(s) |
| Remote ID 3 | Frequency Offset | Time Offset | Assigned Slot(s) |
| Remote ID 4 | Frequency Offset | Time Offset | Assigned Slot(s) |
| ... | ... | ... | ... |
| Remote ID n | Frequency Offset | Time Offset | Assigned Slot(s) |

METHOD, APPARATUS AND SYSTEM FOR RAPID ACQUISITION OF REMOTE NODES IN A COMMUNICATION SYSTEM

CROSS-REFERENCE TO RELATED APPLICATIONS

This application is related to U.S. patent application Ser. No. 10/721,419, filed Nov. 26, 2003, and claims priority to U.S. Provisional Application No. 60/583,790, filed Jun. 30, 2004, the entire contents of each of which are hereby incorporated herein by reference.

BACKGROUND OF THE INVENTION

1. Field of the Invention

This invention relates in general to communication networks and in particular to a method, apparatus and system for rapidly acquiring remote communication nodes in a communication network (e.g., satellite communication network).

2. Discussion of the Background

In communication systems having a communication segment (e.g., a communication link) between a hub and one or more remote communication terminals ("remotes" or "remote nodes") where the communication segment has a relatively high latency time (e.g., a satellite communication system), a disadvantageously long time may be required to acquire the remote nodes and bring them into the communication network. Remote nodes are considered to be out of the network when they are powered down, or recently powered up, or for some other reason have lost communication with the network. Remote nodes are considered to be in a network when they are configured to transmit a signal using a communication frequency and a symbol offset timing that allows the transmission to be recognized and understood by the hub. Moreover, a remote node is in the network when it is configured to send and receive signals in a fashion that is consistent with the network's protocol and timing. The process of converting out of network remotes to in network remotes is known as remote acquisition. The relatively high latency of the communication segment has conventionally resulted in long delays while remote nodes are acquired.

For example, a conventional communication system may include a satellite network having a star or star/mesh topology where the network control entity is located at a central hub earth station and remote earth stations are connected to the hub via satellite link. In such a satellite network, the hub transmits a continuous downstream carrier such that all remotes in the satellite's footprint can receive its transmission. The remote nodes transmit bursts of data to the hub using a Time Division Multiple Access (TDMA) communication scheme. When a remote is first powered on, performs a reset, comes out of a rain fade condition, or otherwise has lost contact with the hub, it must be reacquired. The process of acquisition involves the remote and hub performing station-keeping operations with the goal of preparing the remote to transmit TDMA bursts such that they can be received reliably without corrupting other users of the TDMA channel or neighboring users on other portions of the satellite or on neighboring satellites. Various frequency modifying conditions may cause an uplink transmission from a remote to a hub to arrive at the hub having a different frequency than expected. Frequency modifying conditions may include, for example, differences in cabling, radio frequency (RF) equipment, temperatures, or even satellite motion that causes the frequency to change or to be different than the frequency expected at the hub.

Background acquisition techniques vary from simple to complex, depending on the sophistication of the hub receive circuitry and control mechanism. A very simple and commonly used technique is ALOHA access where the remote terminals burst data randomly to the hub receiver and rely on there being a low probability that no other user will access the channel at that instant. Collisions between data bursts result in data corruption requiring the colliding users to retransmit lost data. Even in an ALOHA system, however, provisions must be made to ensure that the remote's local frequency reference is stable and that its power level is high enough to close the link, but not too high to introduce inter-modulation interference on the satellite transponder.

Different background techniques may be used for TDMA systems where remotes are assigned specific data communication slots in a predefined time frame in which to transmit. One background technique is for a remote to transmit a very short burst (much shorter than its time slot) into its assigned data communication slot. The remote adjusts parameters as directed until the hub determines that the remote is ready to transmit full length traffic bursts in its assigned data communication slot without interfering with other users.

Another background technique involves designating a portion of the TDMA frame as an acquisition slot with additional guard symbols (i.e., the acquisition slot is longer than the acquisition response burst intended to be received in the acquisition slot) to allow remotes to burst an acquisition response with full sized bursts until the station keeping parameters are adjusted.

ALOHA based acquisition inherently breaks down due to an increasing frequency of collisions when the channel use exceeds 18% capacity. Networks configured to operate at larger capacity use predefined slots and a slot assignment methodology and a corresponding acquisition procedure. Background acquisition procedures require multiple "handshakes" back-and-forth between hub and remote in order to bring all station keeping parameters (e.g., remote transmit frequency, symbol offset and power) under control. These handshakes involve waiting for commands and responses to propagate across the long latency satellite channel where the round trip time is as much as half a second. Thus, in the background systems, total acquisition time may be directly proportional to the latency of the communication network, and therefore background communication systems may have a significant scalability problem. Background acquisition algorithms may require several round trip times to complete a single acquisition (some implementations require 20 or more). For example, in a background satellite network requiring three round trips to acquire a single remote, the total time to acquire a remote would be approximately 1.5 seconds. Thus, a network of 1000 remote sites would require 1500 seconds (25 minutes) to fully recover from a network wide reset (less efficient implementations take many hours).

Alternative background systems have addressed this issue by adding complexity and cost to the hub controller such that it can receive many different overlapping messages simultaneously, however the total acquisition time may still be proportional to latency.

FIG. 11 shows an example of a communication network including hub 1100 configured to communicate using communication segment 1102 with a remotely located remote 1104. The communication segment 1102 has a relatively high latency time, for example, a latency of approximately 250 ms in one direction, as in a satellite communication network. Thus, in this example it may take approximately 250 ms for a signal sent by hub 1100 to be received by remote 1104. FIG. 12 shows a further example of a communication network including hub 1300 that is configured to communication via communication segment 1302 with three remote nodes, remote R0 1202, remote R1 1204 and remote R2 1206.

FIG. 13 shows a conventional method for acquiring a single remote in a communication network similar to that of FIG. 11 or 12. In this example to acquire the remote, a hub sends an acquisition command (S1300). The acquisition command is received by the remote and the remote sends an acquisition response (S1314). However that response is not received by the hub because the remote did not send the response using the appropriate communication parameters (e.g., frequency, symbol offset, or power levels) needed for the hub to receive the transmission. Accordingly, when the hub listens for the acquisition response (S1302), the hub does not receive the response. The hub may try again to send a different acquisition command (S1404) which may be received by the remote (S1316), but again the hub does not receive the acquisition response when it listens for the acquisition response (S1306) because the set of parameter values used by a remote for this transmission is still not suitable for allowing the hub to recognize its transmission. Finally, the hub sends acquisition command (S1308) which is received by the remote (S1318) and the acquisition response (which this time uses the correct parameter values) sent by the remote is received by the hub when it listens for the acquisition response (S1310). In this example, the amount of time required to acquire the first remote is shown as acquisition time 1320, which is composed of plural round trip communications that take round trip time 1322 to communicate from the hub to the remote and back to the hub again. In this conventional method, acquisition of the first remote completes prior to the beginning of acquisition of the next remote, for example the first remote must be acquired before sending an acquisition command (S1312) to start the acquisition process for a next remote.

Thus, in a conventional communication system with plural remotes, for example, the communication system shown in FIG. 12, the acquisition time for all of the remotes in the system ("system acquisition time") may be as much as the acquisition time for a single remote (e.g., acquisition time 1320) times the total number of remotes in the system.

Node acquisition may be a frequent occurrence in a background communication system. For example, in a satellite communication system a remote may become out of network due to weather or equipment conditions and plural remotes may become out of network when a maintenance condition or equipment failure causes the hub to be restarted or when plural remotes are remotely upgraded, for example. Further, in the background approach a great deal of time may be spent bringing remotes into the network (i.e., acquiring remotes) and during that acquisition time normal communications may be interrupted.

SUMMARY OF THE INVENTION

Accordingly, one object of this invention is to provide a novel method of acquiring a remote node in a communication network that includes sending a first acquisition command from a hub to the remote. The first acquisition command instructs the remote to send an acquisition response and includes a first frequency. The method also includes sending a first acquisition response based on the first acquisition command from the remote to the hub using the first frequency and sending a second acquisition command from the hub before receiving the first acquisition response at the hub. A related hub apparatus, remote apparatus, computer program product and system each include similar features.

Another object of this invention is to provide a novel method of acquiring a remote that is one of a plurality of remotes in a synchronous communication network that includes steps of transmitting a sequence of downlink messages from a hub to the remote with a common time interval between the start of each downlink message, where the common time interval is less than about twice a time elapsed between sending a message from the hub and receiving the message at the remote. Further, a first downlink message in the sequence includes a first acquisition command for the remote to transmit an acquisition response, and a second downlink message immediately following the first downlink message in the sequence of downlink messages includes a second acquisition command for the remote to transmit an acquisition response. The method also includes receiving a response to the first downlink message at the hub after sending the second downlink message from the hub. A related hub apparatus, remote apparatus, computer program product and system each include similar features.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7A is a data structure diagram of an exemplary uplink frame according to an embodiment of the present invention;

FIG. 7B is a data structure diagram of another exemplary uplink frame according to an embodiment of the present invention;

FIG. 8 is a time plan according to an embodiment of the present invention;

DESCRIPTION OF THE PREFERRED EMBODIMENTS

Figure 1:
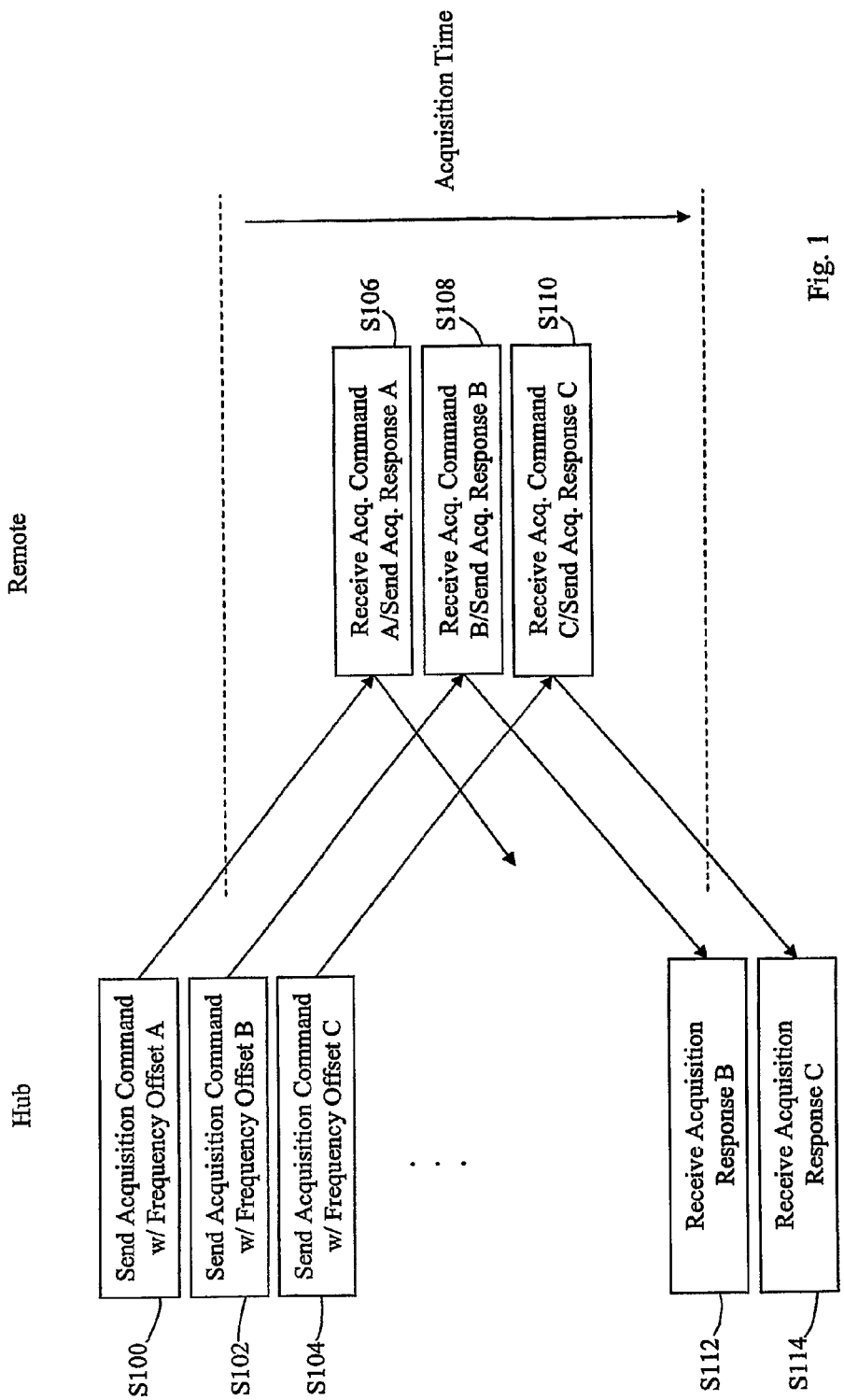
FIG. 1 is a signaling diagram of a method of acquiring a remote according to an embodiment of the present invention.

Referring now to the drawings, wherein like reference numerals designate identical or corresponding parts throughout the several views, and more particularly to FIG. 1 thereof, which is a signaling diagram showing a method of acquiring a remote according to an embodiment of the present invention. In FIG. 1, a hub sends an acquisition command with frequency offset A (S100) to a remote. The acquisition command includes a frequency offset A that instructs a particular remote that receives the acquisition command to transmit an acquisition response to the acquisition command using frequency offset A. In this example, the remote receives the acquisition command A and sends the acquisition response A (S106) at the frequency offset instructed by the hub, which is at a frequency removed from (or "offset" from) the remote's nominal transfer frequency by an amount determined by the value of frequency offset A. In this example, the acquisition response A is not received by the hub, because of a frequency modifying condition, such as equipment variations. Moreover, perhaps there has been a frequency drift between the hub and the receiver, and therefore the receiver believes it is sending its signal at the agreed-upon frequency, but in fact it is offset from the frequency expected by the hub by a predetermined amount.

According to the present embodiment, the hub sends a subsequent acquisition command with frequency offset B (S102) after sending the acquisition command with frequency offset A and before waiting to receive an acquisition response from the remote. Further, the hub may also send additional acquisition commands with other different frequency offsets, for example acquisition command frequency offset C (S104). In this example, the acquisition command with frequency offset B sent by the hub in step S102 is received by the remote and the remote sends an acquisition response B (S108) using the frequency offset B. In this example, the hub receives the acquisition response B sent with frequency offset B (S112).

Thus, by sending plural acquisition commands prior to a point in time in which it is even possible for the hub to receive a response from the remote, and thereby pipelining the acquisition process, a remote may be more quickly acquired by a communication network. In this example, the acquisition time is less than the acquisition time for a single remote according to the background method of FIG. 14. While FIG. 1 shoes an example of three offset signals, the method should not be construed to be so limited. For example, the number of acquisition commands could be anywhere from two to N, where 1/N is the processing time for the remote to produce an acquisition response once it receives an acquisition command signal.

Figure 2:
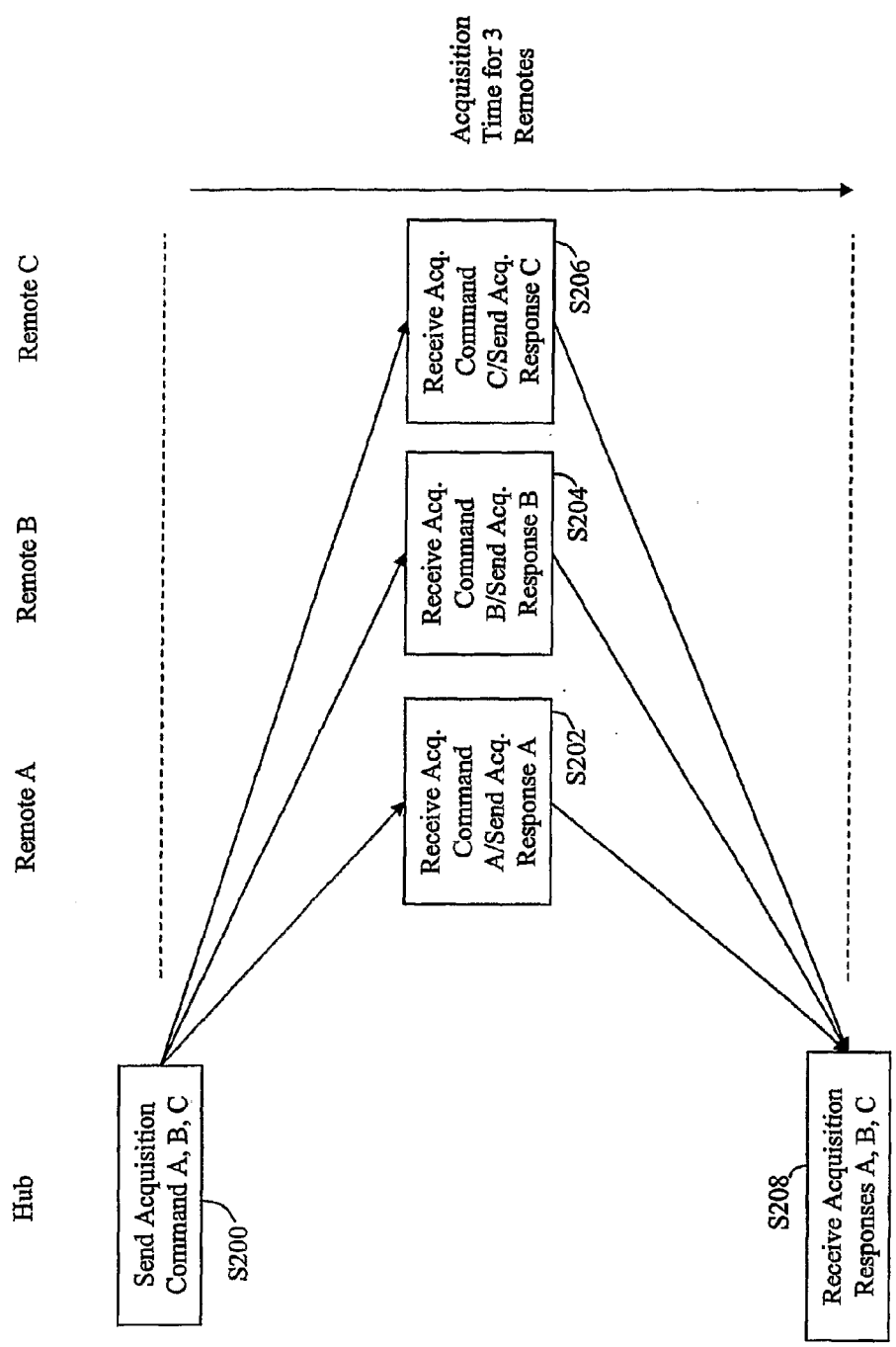
FIG. 2 is a signaling diagram of a method of acquiring remotes according to a further embodiment of the present invention.

FIG. 2 is a signaling diagram of another embodiment of a method of acquiring remotes in a communication network according to the present invention. In this example, the hub sends an acquisition command directed to remotes A, B and C. The acquisition command includes frequency offsets for each of three intended remotes A, B and C. Each of the remotes receives the acquisition command and sends an acquisition response using the appropriate frequency offset (S202/S204/S206). The hub receives the acquisition, responses A, B and C (S208). For example, the acquisition command may instruct each of remotes A, B and C to send their acquisition responses within different acquisition slots in a single uplink message. The hub may receive the three acquisition responses within a single uplink message having multiple allocated acquisition slots, such that the acquisition responses do not interfere with each other or with their uplink data. Thus, a single acquisition command configured to contain plural frequency offsets and directed to plural remotes can acquire those plural remotes within a single round trip delay time.

Figure 3:
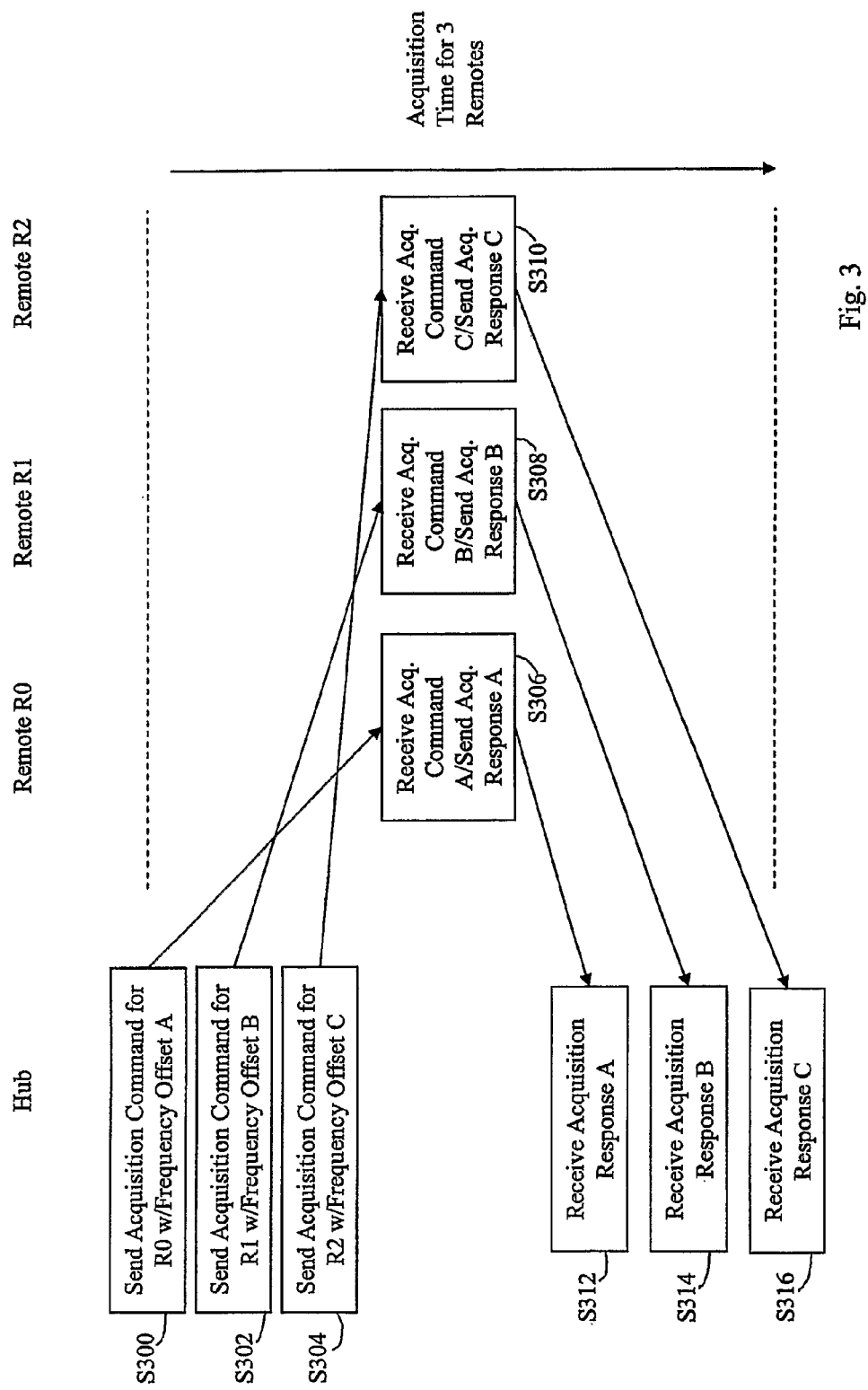
FIG. 3 is a signaling diagram of a method of acquiring remotes according to a further embodiment of the present invention.

FIG. 3 shows another embodiment of a method of acquiring remotes according to the present invention. In this example, the hub sends a first acquisition command intended for remote R0 including a frequency offset A followed by a second acquisition command intended for remote R1 including frequency offset B and a third acquisition command intended for remote R2 with frequency offset C. Remotes R0, R1 and R2 receive each acquisition command and send an acquisition response at a corresponding frequency offset (S306/S308/S310). The hub receives acquisition responses A, B and C sent at frequency offsets A, B and C corresponding to the particular frequency offsets required by each of the remotes so that the signals are received at the same frequency as the hub (S312/S314/S316).

Thus, according to the present embodiment plural remotes may be acquired in a pipeline fashion thereby requiring less acquisition time then in the background method. In particular, according to the present invention, plural remotes may be acquired in a time that is less than an acquisition time of a single remote times the number of remotes to be acquired. Thus, acquisition time is not proportional to latency of the satellite channel. Messages from the hub instructing each individual remote to transmit in a given acquisition slot are sent in a pipelined fashion to all remotes without waiting for any of the remotes to respond. Each remote transmits an acquisition burst back to the hub in the acquisition slot it was instructed to use. When a burst is received by the hub, the hub calculates station keeping correction factors and sends them to the remote and immediately declares the remote "in network" such that it is eligible to be assigned data communication slots.

Remotes may be identified to exist in one of three acquisition states: undetected, detected, and acquired. Remotes that have lost contact with the hub controller are undetected. For example, in the case where a network-wide restart occurs, all remotes become "undetected." "Detected" means that an error free data burst has been received at the hub over the upstream channel in an acquisition slot as assigned. "Acquired" means that the hub has commanded a remote to correct its station keeping parameters (e.g., power level, frequency and symbol timing offsets) and to begin transmitting in data communication slots.

At a network system restart event, all remotes may be undetected, so the undetected remotes are placed in a pool of out of network remotes. The hub schedules the out of network remotes to send a burst to the hub on a designated acquisition slot according to an acquisition scheduling algorithm. The acquisition scheduling algorithm may include a random selection, a round robin selection or a priority based selection, for example. According to the present invention, the hub does not have to wait for any response before scheduling more acquisition bursts from remotes. After all remotes in the pool are commanded to transmit once, the hub controller repeats the acquisition algorithm across the remaining out of network remotes, this time commanding the remotes to use a different frequency offset. As successful bursts are received and remotes are transitioned to the detected state they are removed from the out of network pool. Alternatively, with a priority based scheduling algorithm, a particular high priority remote may be scheduled to be acquired a second time even before all the other remotes are acquired for a first time.

Figure 4:
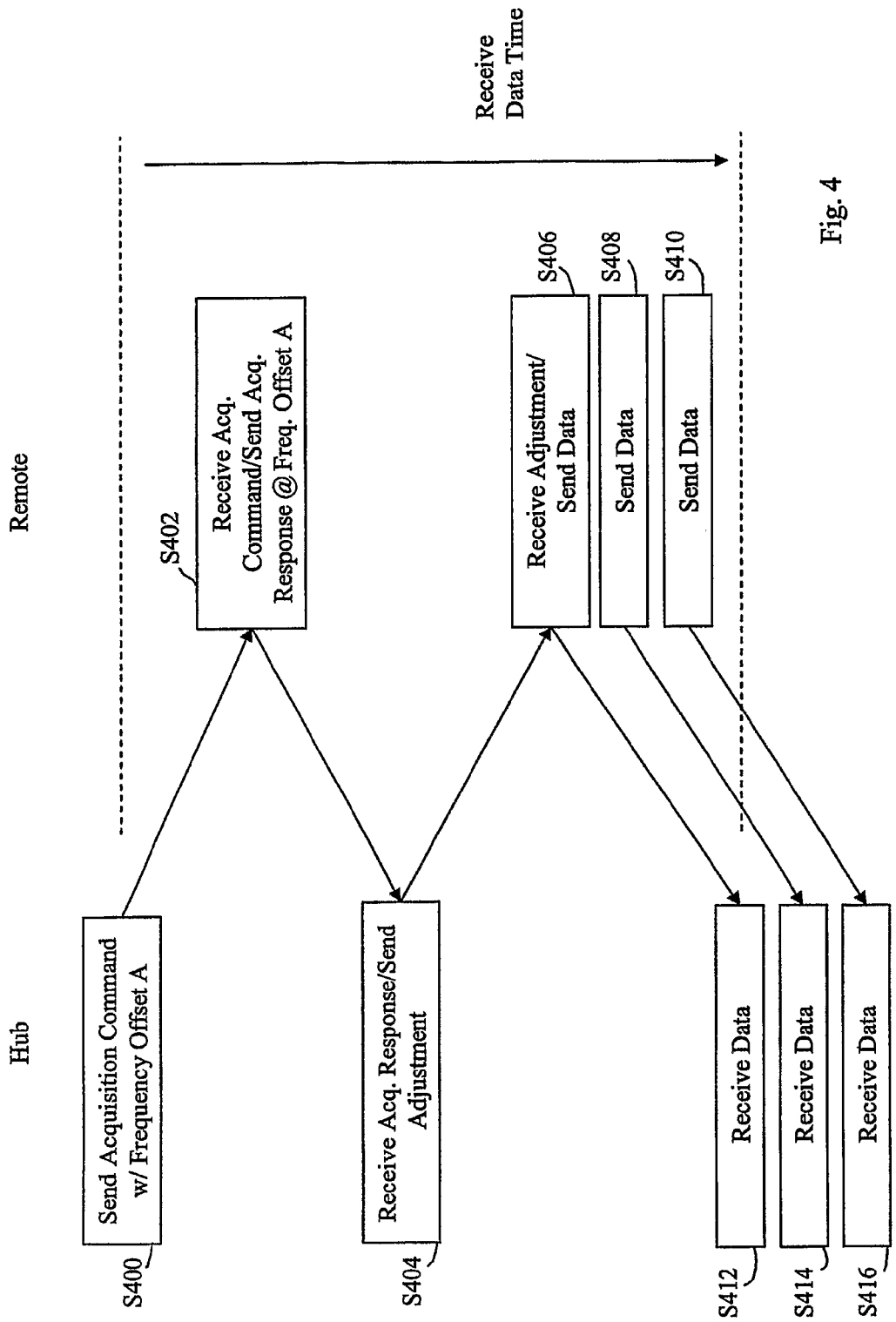
FIG. 4 is a signaling diagram of a method of acquiring a remote according to a further embodiment to the present invention.

FIG. 4 shows another method for acquiring a remote according to a further embodiment of the present invention. In the example of FIG. 4 a hub sends an acquisition command (S400) instructing a remote to transmit its acquisition response at a particular frequency offset A (S400). The remote receives the acquisition command and sends the acquisition response at frequency offset A (S402). In this example, the hub receives the acquisition response but determines that there is a symbol timing offset in the response from the remote. For example, similar factors to those involved in producing a frequency variation may also result in the timing of symbols in a message sent from the remote to the hub to be skewed in time. Accordingly, the hub sends a symbol timing adjustment to the remote (S404) to correct the offset and allow station keeping for the remote. The symbol timing offset is received by the remote and the remote uses the symbol timing offset instructed by the hub as well as the frequency offset instructed by the hub when sending data back to the hub in step (S406/S408/S410). The hub successfully receives the corresponding data (S412/S414/S416) which the remote has transmitted using adjusted frequency and symbol timing offset.

Figure 5:
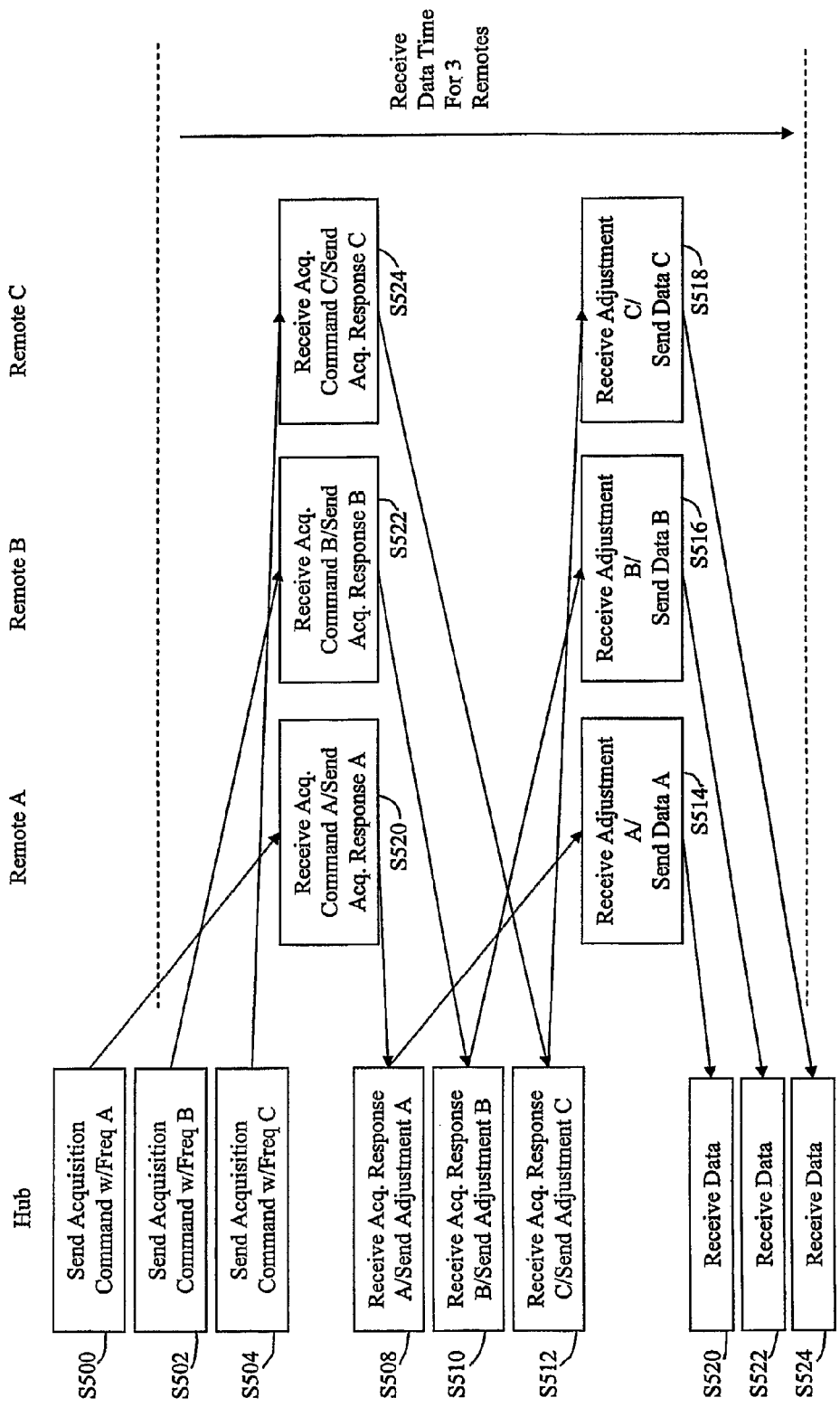
FIG. 5 is a signaling diagram of a method of acquiring remotes according to a further embodiment of the present invention.

FIG. 5 shows an example of adjusting both frequency and symbol timing offset in a communication network having three remotes according to an embodiment of the present invention. In the present example, the hub sends acquisition commands intended for remotes A, B and C (S500/S502/S504). The acquisition commands are received and responses are sent by each of the remotes A, B and C (S520/S522/S524). The acquisition responses are received and individual adjustments are sent by the hub (S508/S510/S512) intended for each of remotes A, B and C. Remotes A, B and C receive the adjustments and send data according to the adjusted symbol timing and frequency (S514/S516/S518). The hub receives the data that the remotes transmitted using the adjusted frequency and symbol timing (S520/S522/S524). Thus, according to the present example frequency and symbol timing adjustments for plural remotes may be made in a pipeline fashion thereby reducing the amount of time to acquire remotes and receive data in a communication network.

Figure 6:
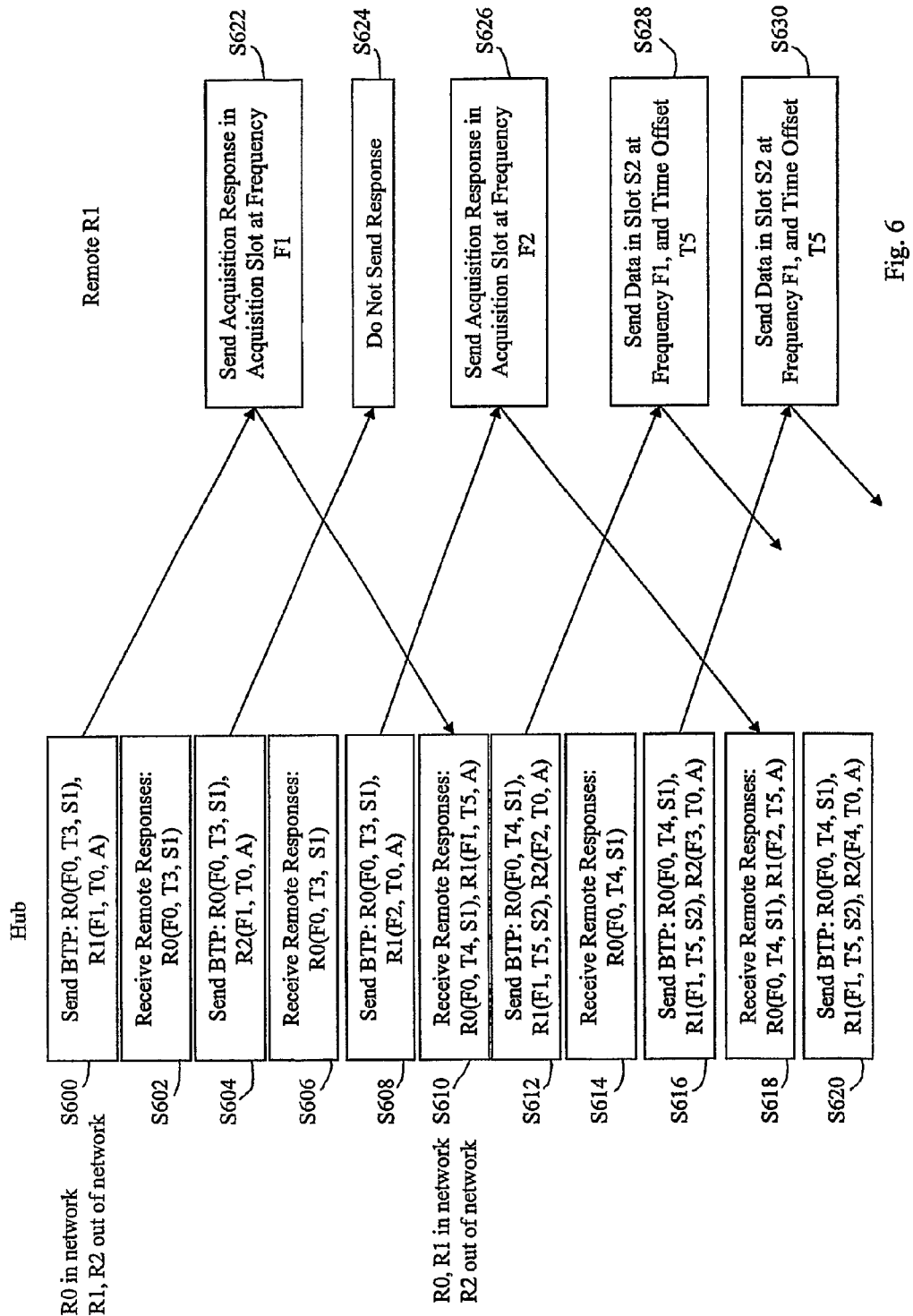
FIG. 6 is a signaling diagram of a method of acquiring remotes according to a further embodiment of the present invention.

FIG. 6 shows an example of acquiring remotes in a synchronous communication network that includes a synchronous communication protocol between the hub and one or more remotes. An example of a synchronous communication protocol that may be used with the present invention is described in U.S. patent application Ser. No. 10/721,419, Method, Apparatus and System for Calculating and Making a Synchronous Burst Time Plan in a Communication Network, filed Nov. 26, 2003, which is incorporated herein in its entirety. In such a synchronous communication network, the hub sends a burst time plan at regular intervals on a communication channel that may be received by all the remotes in the communication network. The burst time plan includes various communication parameters used by the remotes to coordinate uplink communications from remotes to the hub to ensure that regular communication occurs. For example, the burst time plan may define one or more time division multiple access (TDMA) time slots assigned to each remote, such that the assigned remote uses those time slots for transmitting uplink data from the remote to the hub without conflicting with other remotes that may be assigned other time slots in the uplink data stream. The burst time plan may also identify one or more remotes that are requested to transmit within one or more acquisition time slots allocated within the uplink frame. In addition, the burst time plan may indicate a number of delay frames for a remote to wait before sending uplink data in an assigned time slot. Acquisition slots may be longer than data communication time slots to accommodate a transmission from a remote that has not yet had its symbol timing corrected and thereby may be shifted in time by an amount greater than the time allocated for a particular communication slot. In particular, one or more acquisition slots may include additional guard symbols such that remotes can transmit a full burst into an acquisition slot without the possibility of "missing" the slot, which might corrupt other traffic slots (e.g., data communication slots) or other acquisition slots.

FIG. 7A shows an example of a structure of an uplink frame 700 used in a synchronous communication network based embodiment of the present invention. The uplink frame in the present example includes data communication slots S0, S1, S2. SN as well as a single acquisition time slot which is larger than any of the individual data time slots. FIG. 7B shows an example of an uplink time frame 702 that includes plural acquisition slots A0, A1, A2 . . . Am.

FIG. 8 shows an example of information included in a burst time plan 800 sent from the hub to the remotes. Each information record in the burst time plan 800 may include, for example, a remote ID 802 and a frequency offset 804, time offset 806 and a list of assigned slots 808 for each remote ID 802. Thus, when the remote having remote ID 802 receives the burst time plan it is instructed to use a particular frequency offset time offset and particular assigned slots in a subsequent uplink frame.

In the example of FIG. 6, a scenario is shown in which a hub communicates with three remotes R0, R1 and R2. In that example, R0 is already in network and is already configured to communicate in a data communication slot using a particular frequency offset and symbol timing offset. However, remotes R1 and R2 are out of the network and are not yet configured to communicate with the hub. The hub sends a burst time plan (BTP) in S600 instructing remote R0 to use frequency offset F0, symbol timing offset T3 and to transmit data in upstream data communication slot 51 as previously negotiated (not shown). Further the BTP seeks to acquire remote R1 by instructing remote R1 to transmit an acquisition response in the acquisition slot A using frequency offset F1 and symbol timing offset T0. In step S602 the hub receives a response from the remote in the network R0 using communication parameters previously negotiated (not shown), which in this example are frequency F0, symbol timing offset T3 and in slot S1. Subsequently, the hub sends a new burst time plan in step S604 instructing remote R0 to transmit data in uplink slot S1 using frequency offset F0 and timing offset T3 and also seeks to acquire remote R2 by instructing remote R2 to transmit using frequency offset F1 and symbol timing offset T0 in acquisition slot A.

Next, in step S606 the hub receives a response from the remote in the network, R0, at frequency offset F0, symbol timing offset T3 and in slot S1. Next, in step S608 the hub sends a burst time plan instructing the in network remote R0 to transmit in uplink slot S1 using frequency offset F0 and symbol timing offset T3 as previously negotiated (not shown). Remote R1 is still not yet acquired from the hub's perspective so the hub again seeks to acquire R1 but now using a different frequency than was used in a previous burst time plan. In this example, the burst time plan includes instructions for remote R1 to send an acquisition response in the acquisition slot A using different frequency offset F2 and symbol timing offset T0. Next, the hub receives remote responses from the remote in network R0 transmitted in slot S1 and at frequency offset F0 but now with symbol timing offset T4.

According to the present invention, the hub may continuously adapt to changing conditions, for example, changes in symbol timing of uplink transmissions. In addition, in the step S610, the hub also receives a remote response in the acquisition slot from remote R1 transmitted at frequency offset F1 and received with symbol timing offset T5. The response received by the hub in step S610 was sent by remote R1 in step S622 which in turn was in response to an acquisition command sent by the hub in step S600. Remote R1 sent an acquisition response in the acquisition slot at frequency F1 in step S622 and various parameters in the system caused a symbol timing offset of five symbols by the time the response was received by the hub in step S610. Thus, in the next time frame when the hub sends a new burst time plan (S612), the burst time plan includes instructions for remote R0 to transmit at frequency offset F0 and also to now use timing offset T4 to correct the timing offset detected in the previous response received in step S610.

Further, the hub now considers R1 to be in network because the acquisition response sent in S622 was received in step S610. Therefore, the burst time plan instructs remote R1 to send uplink data in uplink data communication slot S2 using frequency offset F1 and symbol timing offset T5. Further, in this burst time plan the hub seeks to acquire remote R2 using a different frequency than was previously used to attempt to acquire remote R2 in step S604. Thus, in this burst time plan the hub instructs remote R2 to send an acquisition response in the acquisition slot using frequency offset F2 and symbol timing offset T0. In step S614 the hub receives remote responses from the remotes that were in the network previously and in this case receives a response only from remote R0 in slot S1 transmitted at frequency F0 and received with a symbol timing offset of T4.

In step S616 the hub sends a new burst time plan instructing remote R0 to transmit data in slot S1 using frequency offset F0 and symbol timing offset T4. Further, the burst time plan instructs remote R1 to transmit uplink data in uplink time slot S2 using frequency offset F1 and symbol timing offset T5 and further the hub seeks to acquire remote R2 using a new frequency F3 and thereby instructing the remote R2 to transmit at frequency F3 in acquisition slot A. In step S618 the hub receives remote responses from R0 in slot S1 at frequency offset F0 and corrected symbol timing offset T4 and further receives an acquisition response from remote R1 in the acquisition slot using frequency F2 and symbol timing offset T5. At this point the hub may choose to use this new frequency for R1 or may continue with the frequency detected previously, that is frequency F1. Thus in step S620 the hub sends a new burst time plan instructing remote R0 to transmit data in uplink slot S1 using frequency offset F0 and symbol timing offset T4 and instructs remote R1 to transmit uplink data in slot S2 using frequency offset F1 and symbol timing offset T5. Further the hub continues to seek to acquire remote R2 but now using a new frequency offset. In this example R2 is instructed to send an acquisition response in the acquisition slot A using frequency offset F4 and symbol timing offset T0.

In step S624 the remote R1 receives the burst time plan sent by the hub in step S604. However that burst time plan does not instruct the remote R1 to send an acquisition response or data thus the remote R1 does not send a response to that burst time plan. In step S626 the remote R1 receives the burst time plan sent by the hub in step S608 which instructed the remote R1 to send an acquisition response in the acquisition slot at frequency F2. Thus, even though remote R1 has previously sent an acquisition response in step S622, the remote R1 sends another acquisition response, this time using frequency F2. The acquisition response sent by remote R1 in step S626 is received by the hub in step S618. In step S628 the remote R1 receives the burst time plan from the hub sent in step S612 which instructs remote R1 to transmit uplink data in slot S2 using frequency offset F1 and symbol timing offset T5. Accordingly, the remote R1 sends data in that slot using those communication parameters. In step S630 remote R1 receives the burst time plan sent by the hub in step S616 and accordingly sends uplink data in slot S2 using frequency offset F1 and symbol timing offset T5. Thus, as shown in this example the present invention makes it possible for remote acquisition to occur in a pipeline fashion in parallel with other communication tasks and thereby allows remotes to be more rapidly acquired.

Further, although the present example is illustrated using a burst time plan with a single acquisition slot, the invention also includes burst time plans with more than one acquisition slot allowing plural remotes to be instructed to transmit in plural acquisition slots using a single burst time plan or to transmit the plural acquisition responses within a single uplink frame without overlapping in time and thereby allowing plural remotes to be more rapidly acquired. Thus, according to the present embodiment, during a system wide restart, there is no need to allocate traffic slots in a TDMA uplink frame because all remotes are undetected. Therefore, multiple acquisition slots may be dynamically allocated in a single uplink frame so that the pool of remotes can be serviced more quickly. As remotes begin to acquire, traffic slots are added to the frame and the number of acquisition slots are reduced. Once all remotes have joined the network there is less need for acquisition slots. Thus, according to the present invention, a number of acquisition slots may be fixed or may be dynamically allocated according to the state of the system.

In addition, the present invention includes a frequency offset selecting algorithm for selecting a next frequency offset to use when attempting to acquire a remote. The frequency offset selecting algorithm for selecting the next frequency includes selecting a frequency with a higher probability of success to thereby more rapidly acquire remotes that are out of the network. For example the next frequency offset to attempt communication with a remote may be based on an increment from a previously attempted frequency offset where the increment is based on a dynamic range of one of the hub, remote, or communication segment communication capabilities. Alternatively, a next frequency to attempt may be based on a previously identified frequency offset for another remote, or a previously identified frequency offset for the same remote but during a prior acquisition.

The range over which the frequency offset is varied by the hub while seeking to acquire remotes may be limited by a common mode frequency offset calculated according to a further embodiment of the present invention. The inventors of the present invention have discovered that a major contributor to frequency offset is the hub receive equipment which may be common to plural remote-to-hub transmission paths. As remotes begin to be acquired, an average value of frequency offsets may be maintained and this value may be used to calculate a common mode offset due to hub receive equipment. The frequency offset at which remotes are instructed to transmit may be adjusted to a new nominal value based on the calculated common mode offset to more rapidly identify a frequency offset required for a particular remote and reduce the range of frequencies through which the hub will sweep when seeking to acquire remotes.

Figure 9:
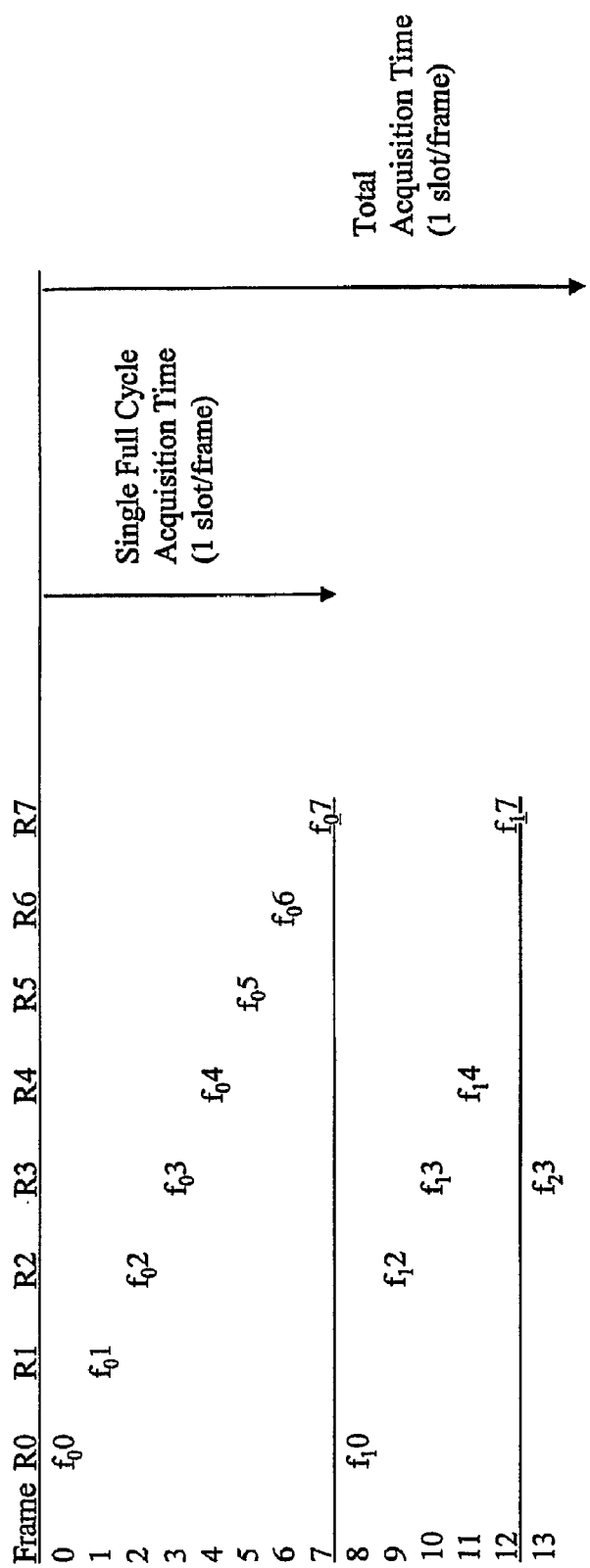
FIG. 9 is a timing diagram for acquisition of remotes according to another embodiment of the present invention.

FIG. 9 shows an example of a method of acquiring eight remotes according to an embodiment of the present invention. In this example using an uplink frame that includes a single acquisition slot, each of the eight remotes are instructed to transmit in the acquisition slot in each of eight time frames (i.e., time frames 0-7). Further, according to this example, remotes R1, R5 and R6 are acquired in their first attempts, while remotes R0, R2, R3, R4 and R7 are not acquired in the first attempt. Thus the remotes that are not yet acquired are again instructed to transmit in acquisition time slots now using new frequency offsets ($F_10$-$F_17$) selected according to a frequency selecting algorithm. Further, in this example, remotes R0, R2, R4 and R7 are successfully acquired in the second attempt, however remote R3 is not acquired. Thus, in the subsequent frame only remote R3 is instructed to transmit in the acquisition slot now using a new frequency offset $F_23$. Thus, this example illustrates that in a network with plural remotes remote acquisition may be performed with a great deal of parallelism and thereby reduce the total acquisition time.

Figure 10:
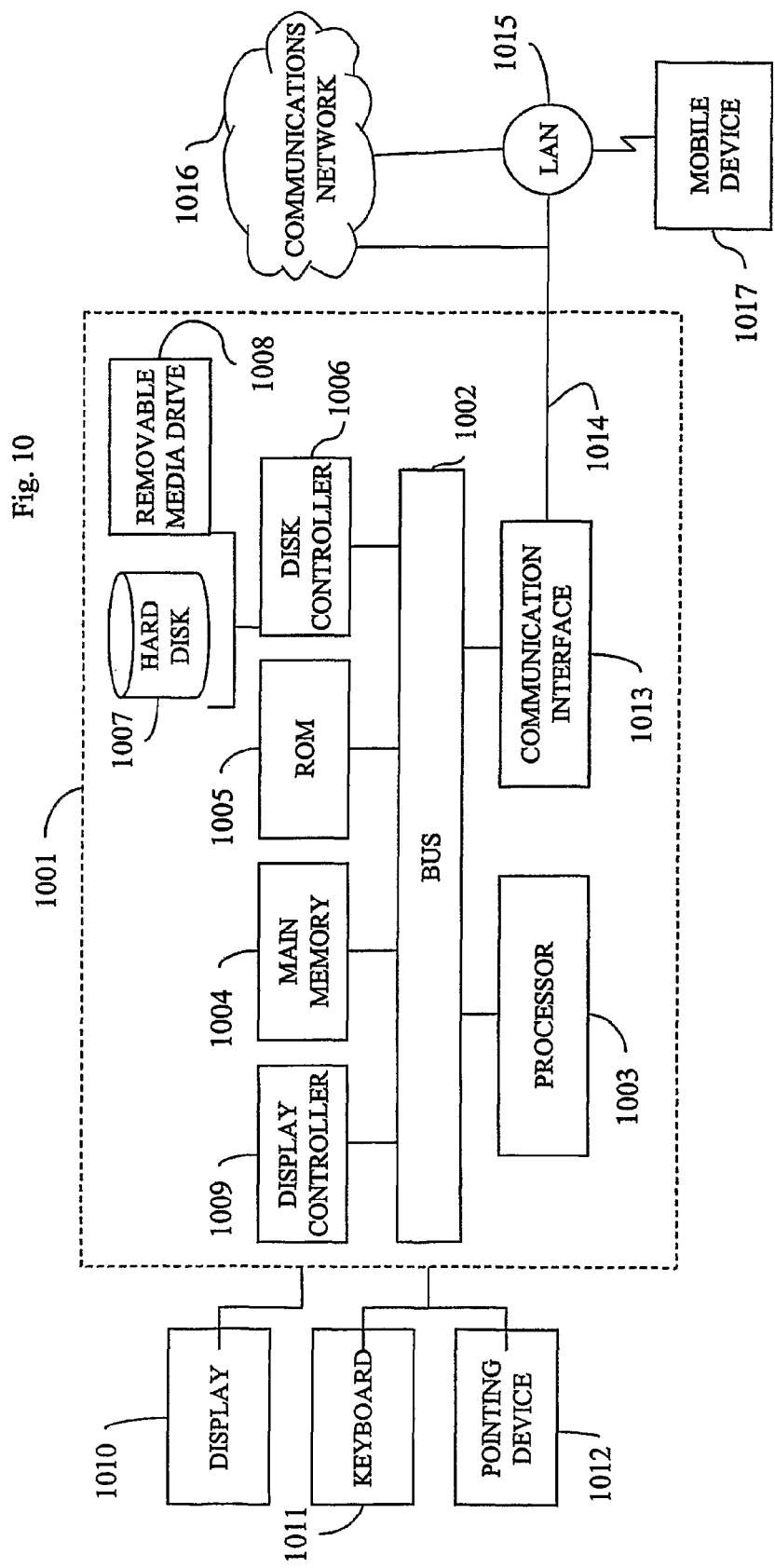
FIG. 10 is a block diagram of a computer system used in an embodiment of the present invention.
Figure 11:
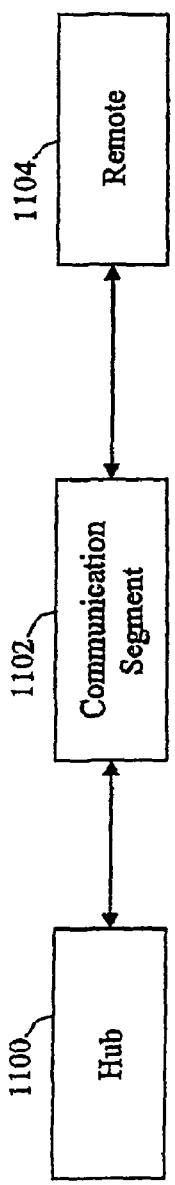
FIG. 11 is a block diagram of a communication system with a single remote.
Figure 12:
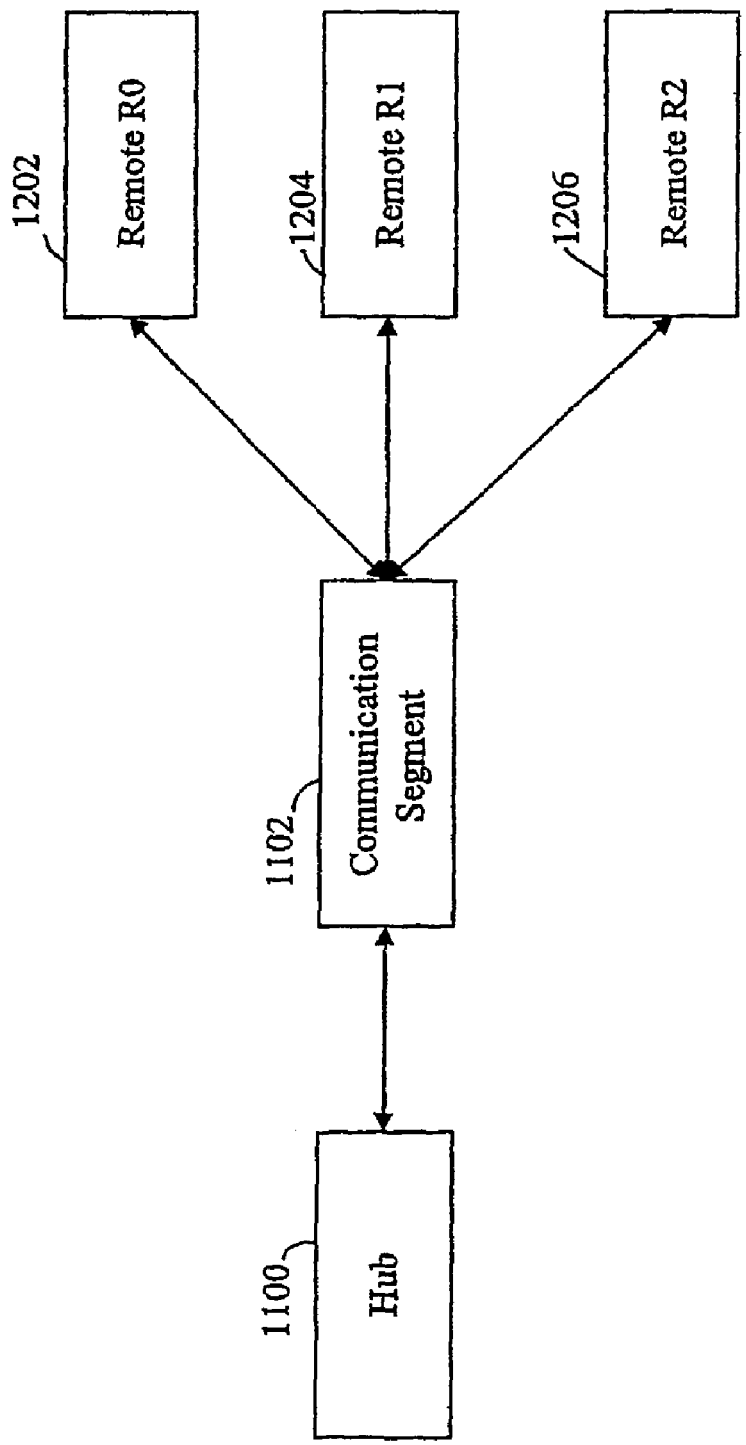
FIG. 12 is a block diagram of a communication system with three remotes.
Figure 13:
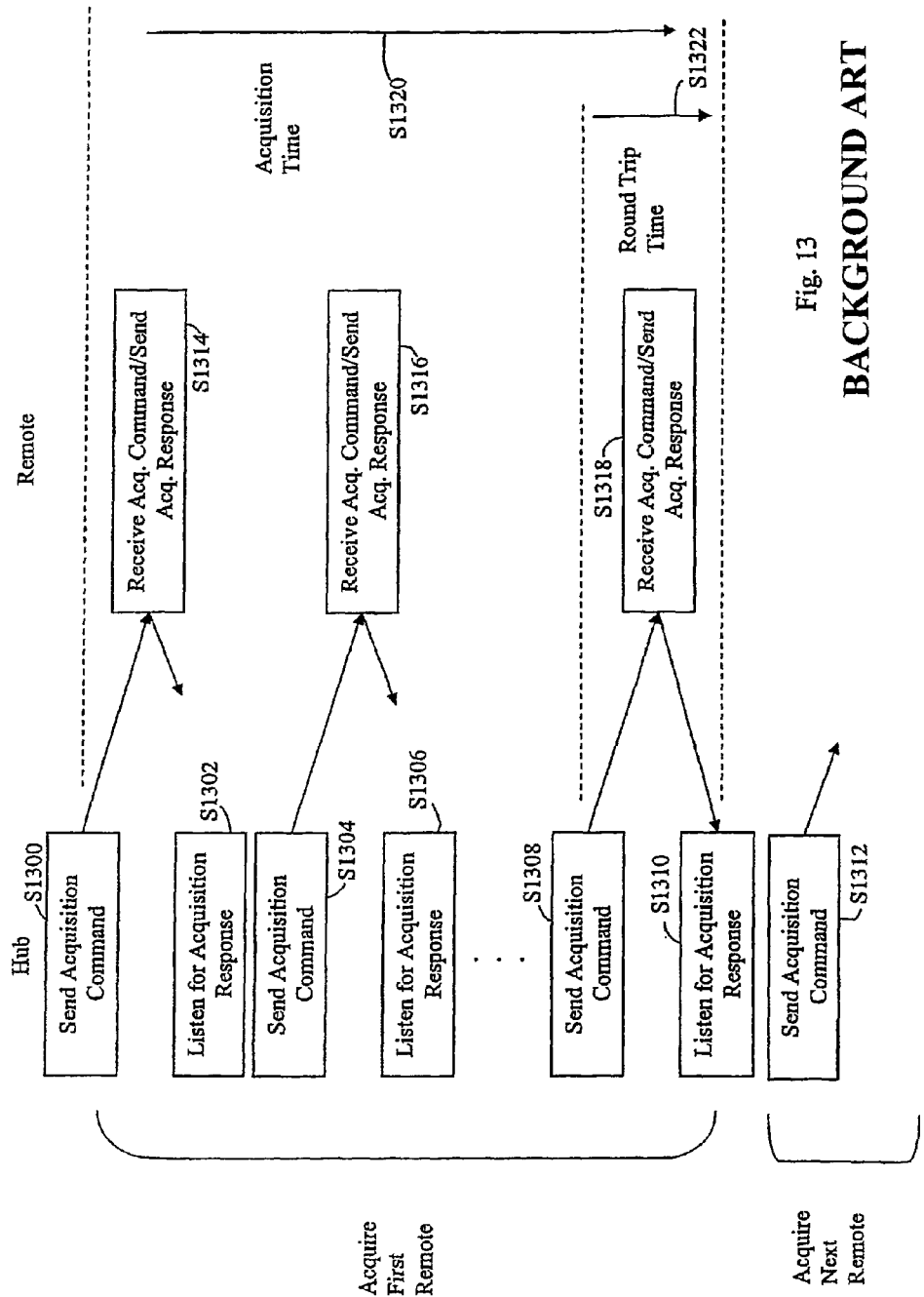
FIG. 13 is a signaling diagram of a background method of acquiring a remote.

FIG. 10 illustrates a computer system 1001 upon which an embodiment of the present invention may be implemented. The computer system 1001 includes a bus 1002 or other communication mechanism for communicating information, and a processor 1003 coupled with the bus 1002 for processing the information. The computer system 1001 also includes a main memory 1004, such as a random access memory (RAM) or other dynamic storage device (e.g., dynamic RAM (DRAM), static RAM (SRAM), and synchronous DRAM (SDRAM)), coupled to the bus 1002 for storing information and instructions to be executed by processor 1003. In addition, the main memory 1004 may be used for storing temporary variables or other intermediate information during the execution of instructions by the processor 1003. The computer system 1001 further includes a read only memory (ROM) 1005 or other static storage device (e.g., programmable ROM (PROM), erasable PROM (EPROM), and electrically erasable PROM (EEPROM)) coupled to the bus 1002 for storing static information and instructions for the processor 1003.

The computer system 1001 also includes a disk controller 1006 coupled to the bus 1002 to control one or more storage devices for storing information and instructions, such as a magnetic hard disk 1007, and a removable media drive 1008 (e.g., floppy disk drive, read-only compact disc drive, read/write compact disc drive, compact disc jukebox, tape drive, and removable magneto-optical drive). The storage devices may be added to the computer system 1001 using an appropriate device interface (e.g., small computer system interface (SCSI), integrated device electronics (IDE), enhanced-IDE (E-IDE), direct memory access (DMA), or ultra-DMA).

The computer system 1001 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1001 may also include a display controller 1009 coupled to the bus 1002 to control a display 1010, such as a cathode ray tube (CRT), for displaying information to a computer user. The computer system includes input devices, such as a keyboard 1011 and a pointing device 1010, for interacting with a computer user and providing information to the processor 1003. The pointing device 1012, for example, may be a mouse, a trackball, or a pointing stick for communicating direction information and command selections to the processor 1003 and for controlling cursor movement on the display 1010. In addition, a printer may provide printed listings of data stored and/or generated by the computer system 1001.

The computer system 1001 performs a portion or all of the processing steps of the invention in response to the processor 1003 executing one or more sequences of one or more instructions contained in a memory, such as the main memory 1004. Such instructions may be read into the main memory 1004 from another computer readable medium, such as a hard disk 1007 or a removable media drive 1008. One or more processors in a multi-processing arrangement may also be employed to execute the sequences of instructions contained in main memory 1004. In alternative embodiments, hard-wired circuitry may be used in place of or in combination with software instructions. Thus, embodiments are not limited to any specific combination of hardware circuitry and software.

As stated above, the computer system 1001 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1001, for driving a device or devices for implementing the invention, and for enabling the computer system 1001 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1003 for execution. A computer readable medium may take many forms, including but not limited to, non-volatile media, volatile media, and transmission media. Non-volatile media includes, for example, optical, magnetic disks, and magneto-optical disks, such as the hard disk 1007 or the removable media drive 1008. Volatile media includes dynamic memory, such as the main memory 1004. Transmission media includes coaxial cables, copper wire and fiber optics, including the wires that make up the bus 1002. Transmission media also may also take the form of acoustic or light waves, such as those generated during radio wave and infrared data communications.

Various forms of computer readable media may be involved in carrying out one or more sequences of one or more instructions to processor 1003 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1001 may receive the data on the telephone line and use an infrared transmitter to convert the data to an infrared signal. An infrared detector coupled to the bus 1002 can receive the data carried in the infrared signal and place the data on the bus 1002. The bus 1002 carries the data to the main memory 1004, from which the processor 1003 retrieves and executes the instructions. The instructions received by the main memory 1004 may optionally be stored on storage device 1007 or 1008 either before or after execution by processor 1003.

The computer system 1001 also includes a communication interface 1013 coupled to the bus 1002. The communication interface 1013 provides a two-way data communication coupling to a network link 1014 that is connected to, for example, a local area network (LAN) 1015, or to another communications network 1016 such as the Internet. For example, the communication interface 1013 may be a network interface card to attach to any packet switched LAN. As another example, the communication interface 1013 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1013 sends and receives electrical, electromagnetic or optical signals that carry digital data streams representing various types of information.

The network link 1014 typically provides data communication through one or more networks to other data devices. For example, the network link 1014 may provide a connection to another computer through a local network 1015 (e.g., a LAN) or through equipment operated by a service provider, which provides communication services through a communications network 1016. The local network 1014 and the communications network 1016 use, for example, electrical, electromagnetic, or optical signals that carry digital data streams, and the associated physical layer (e.g., CAT 5 cable, coaxial cable, optical fiber, etc). The signals through the various networks and the signals on the network link 1014 and through the communication interface 1013, which carry the digital data to and from the computer system 1001 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1001 can transmit and receive data, including program code, through the network(s) 1015 and 1016, the network link 1014 and the communication interface 1013. Moreover, the network link 1014 may provide a connection through a LAN 1015 to a mobile device 1017 such as a personal digital assistant (PDA) laptop computer, or cellular telephone.

Numerous modifications and variations of the present invention are possible in light of the above teachings. It is therefore to be understood that within the scope of the appended claims, the invention may be practiced otherwise than as specifically described herein.

The invention claimed is:

1. A method of acquiring a remote node that is not yet acquired by a hub in a satellite communication network, said method comprising steps of:
   sending a first acquisition command from the hub to the remote node that is not yet acquired to acquire the remote node to be added to the network, said first acquisition command
   instructing the remote node to send an acquisition response, and including a first frequency;
   sending a first acquisition response based on the first acquisition command from the remote node to the hub using the first frequency;
   sending a second acquisition command from the hub before receiving the first acquisition response at the hub;
   selecting a next acquisition remote node according to at least one of a round robin algorithm, a least recently used algorithm, and a priority algorithm; and
   selecting a next frequency based on an offset frequency of a previous acquisition command,
   wherein the second acquisition command identifies the next acquisition remote node for acquisition and includes the next frequency.

2. The method of claim 1, wherein the second acquisition command identifies the remote node or another remote node that is not yet acquired by the hub for acquisition and includes one of the first frequency and a second frequency.

3. The method of claim 1, further comprising steps of:
   detecting a symbol offset in the first response at the hub; and
   sending a symbol offset correction factor from the hub to the remote node, said correction factor used by the remote node in a subsequent transmission from the remote node to the hub to correct the symbol offset detected in the detecting step.

4. The method of claim 1, further comprising a step of:
   sending at least a third acquisition command from the hub before receiving the first response at the hub.

5. The method of claim 1, further comprising sending the second acquisition command from the hub within a latency time of sending the first acquisition command from the hub, wherein the latency time is twice a time elapsed between sending a message from the hub and receiving the message at the remote node.

6. The method of claim 1, wherein the first frequency includes a frequency offset that informs the remote node to transmit a response based on a predetermined nominal remote transmit frequency and the frequency offset.

7. A method of acquiring a remote node that is not yet acquired by a hub in a synchronous satellite communication network, said method comprising steps of:
   transmitting a sequence of downlink messages from the hub to the remote node that is not yet acquired with a common time interval between the start of each downlink message, said common time interval being less than twice a time elapsed between sending one of the downlink messages from the hub and receiving the one of the downlink messages at the remote node, wherein
   a first downlink message in the sequence includes a first acquisition command to acquire the remote node to be added to the network and cause the remote node to transmit a first acquisition response, and
   a second downlink message immediately following the first downlink message in the sequence of downlink messages includes a second acquisition command for the remote node to transmit a second acquisition response; and
   receiving the first acquisition response to the first downlink message at the hub after sending the second downlink message from the hub.

8. The method of claim 7, further comprising steps of:
   allocating time for a sequence of uplink frames from the remote node to the hub with the common time interval between the start of each uplink frame; and
   allocating time for at least one data communication time slot and at least one acquisition time slot within each uplink frame, wherein each downlink message includes a burst time plan instructing the remote node to transmit a data burst within the at least one data communication slot of a subsequent uplink frame and instructing the remote node to transmit an acquisition response within the at least one acquisition slot.

9. The method of claim 8, wherein each burst time plan includes station keeping parameters for at least two remote nodes that are not yet acquired and the burst time plan instructs at least one of the at least two remote nodes to transmit a data burst or an acquisition response according to the station keeping parameters.

10. The method of claim 9, wherein the station keeping parameters include at least one of a frequency, a symbol offset, and a power level.

11. A hub apparatus configured to acquire a remote node that is not yet acquired by the hub in a satellite communication network, said hub apparatus comprising:
an acquisition unit configured to send a first acquisition command to the remote node that is not yet acquired to acquire the remote node to be added to the network, said first acquisition command configured to instruct the remote node to send an acquisition response, and include an indication of a first frequency;
a receiving unit configured to receive a first acquisition response based on the first acquisition command from the remote node using the first frequency;
said acquisition unit is further configured to send a second acquisition command before the receiving unit receives the first acquisition response;
a next remote selecting unit configured to select a next acquisition remote node according to at least one of a round robin algorithm, a least recently used algorithm, and a priority algorithm, and
a next frequency selecting unit configured to select a next frequency based on an offset frequency of a previous acquisition command,
wherein the second acquisition command identifies the next acquisition remote node for acquisition and includes the next frequency.

12. The hub apparatus of claim 11, wherein the second acquisition command identifies the remote node or another remote node that is not yet acquired for acquisition and includes one of the first frequency and a second frequency.

13. The hub apparatus of claim 11, further comprising:
a detecting unit configured to detect a symbol offset in the first response; and
an offset sending unit configured to send a symbol offset correction factor to the remote node, said correction factor used by the remote node in a subsequent transmission from the remote node to correct the detected symbol offset.

14. The hub apparatus of claim 11, wherein the acquisition unit is further configured to send at least a third acquisition command before the receiving unit receives the first acquisition response.

15. The hub apparatus of claim 11, wherein
the acquisition unit is further configured to send the second acquisition command within a latency time of sending the first acquisition command, and
the latency time is twice a time elapsed between sending a message and receiving the message at the remote node.

16. The hub apparatus of claim 11, wherein the indication of the first frequency includes a frequency offset that informs the remote node to transmit a response based on a predetermined nominal remote transmit frequency and the frequency offset.

17. A hub apparatus configured to acquire a remote node that is not yet acquired by the hub in a synchronous communication network, said hub apparatus comprising:
a transmitting unit configured to transmit a sequence of downlink messages to the remote node that is not yet acquired with a common time interval between the start of each downlink message, said common time interval being less than twice a time elapsed between transmitting one of the downlink messages from the transmitting unit and receiving the one of the downlink messages at the remote node,
a first downlink message in the sequence includes a first acquisition command to acquire the remote node to be added to the network and cause the remote node to transmit a first acquisition response, and
a second downlink message immediately following the first downlink message in the sequence of downlink messages includes a second acquisition command for the remote node to transmit a second acquisition response; and
a receiving unit configured to receive the first acquisition response to the first downlink message after the transmitting unit sends the second downlink message.

18. The hub apparatus of claim 17, wherein the receiving unit is further configured to allocate time for a sequence of uplink frames from the remote node with the common time interval between the start of each uplink frame and allocate time for at least one data communication time slot and at least one acquisition time slot within each uplink frame,
wherein each downlink message includes a burst time plan instructing the remote node to transmit a data burst within the at least one data communication slot of a subsequent uplink frame and instructing the remote node to transmit an acquisition response within the at least one acquisition slot.

19. The hub apparatus of claim 18, wherein each burst time plan includes station keeping parameters for at least two remote nodes that are not already acquired and the burst time plan instructs at least one of the at least two remote nodes to transmit a data burst or an acquisition response according to the station keeping parameters.

20. The hub apparatus of claim 19, wherein the station keeping parameters include at least one of a frequency, a symbol offset, and a power level.

21. A remote apparatus that is not yet acquired by a hub in a synchronous satellite communication network, said remote apparatus comprising:
a receiving unit configured to receive a sequence of downlink messages from the hub with a common time interval between the start of each downlink message, said common time interval being less than twice a time elapsed between sending a message from the hub and receiving the message at the receiving unit;
a response sending unit configured to send a first acquisition response to the hub based on a first acquisition command from the hub to acquire the remote apparatus to be added to the network, said first acquisition command included in a first downlink message in the sequence and send a second acquisition response to the hub based on a second acquisition command included in a second downlink message in the sequence,
wherein the first acquisition response is received at the hub after the hub sends the second downlink message.

22. The remote apparatus of claim 21, wherein the response sending unit is further configured to allocate time for a sequence of uplink frames to the hub with the common time interval between the start of each uplink frame and allocate time for at least one acquisition time slot within a subsequent uplink frame and send an acquisition response to the hub within the at least one acquisition slot based on a burst time plan in the first downlink message that identifies the at least one acquisition time slot.

23. The remote apparatus of claim 22, wherein the response sending unit is further configured to allocate time for at least one data communication time slot within each uplink frame and send a data burst within the at least one data communication slot of a subsequent uplink frame based on the burst time plan in the first downlink message that identifies the at least one data communication slot.

24. The remote apparatus of claim 23, wherein the burst time plan includes station keeping parameters for the remote apparatus and another remote apparatus that is not yet acquired and the response sending unit is further configured to send the data burst or the acquisition response based on the station keeping parameters.

25. The remote apparatus of claim 24, wherein the station keeping parameters include at least one of a frequency, a symbol offset, and a power level.

26. A non-transitory computer readable medium having computer program instructions which when executed by a computer cause the computer to perform the following steps:
    sending a first acquisition command from a hub to a remote node that is not yet acquired by the hub, said first acquisition command sent to acquire the remote node to be added to the network,
        instructing the remote node to send an acquisition response, and
        including a first frequency;
    sending a first acquisition response based on the first acquisition command from the remote node to the hub using the first frequency;
    sending a second acquisition command from the hub before receiving the first acquisition response at the hub;
    selecting a next acquisition remote node according to at least one of a round robin algorithm, a least recently used algorithm, and a priority algorithm; and
    selecting a next frequency based on an offset frequency of a previous acquisition command,
    wherein the second acquisition command identifies the next acquisition remote node for acquisition and includes the next frequency.

27. The computer readable medium of claim 26, wherein the second acquisition command identifies the remote node or another remote that is not yet acquired for acquisition and includes one of the first frequency and a second frequency.

28. The computer readable medium of claim 26, further storing instructions causing the computer to perform steps of:
    detecting a symbol offset in the first response at the hub; and
    sending a symbol offset correction factor from the hub to the remote node, said correction factor used by the remote node in a subsequent transmission from the remote node to the hub to correct the detected symbol offset.

29. The computer readable medium of claim 26, further storing instructions causing the computer to perform a step of:
    sending at least a third acquisition command from the hub to the remote node before receiving the first response at the hub.

30. The computer readable medium of claim 26, further storing instructions causing the computer to perform a step of:
    sending the second acquisition command from the hub within a latency time of sending the first acquisition command from the hub,
    wherein the latency time is twice a time elapsed between sending a message from the hub and receiving the message at the remote node.

31. The computer readable medium of claim 26, wherein the first frequency includes a frequency offset that informs the remote node to transmit a response based on a predetermined nominal remote transmit frequency and the frequency offset.

32. A non-transitory computer readable medium having computer program instructions which when executed by a computer cause the computer to perform the following steps of acquiring a remote node that is not yet acquired by a hub in a synchronous satellite communication network:
    transmitting a sequence of downlink messages from the hub to the remote node that is not yet acquired with a common time interval between the start of each downlink message, said common time interval being less than twice a time elapsed between sending one of the downlink messages from the hub and receiving the one of the downlink messages at the remote node,
    a first downlink message in the sequence includes a first acquisition command to acquire the remote node to be added to the network and causes the remote node to transmit a first acquisition response, and
    a second downlink message immediately following the first downlink message in the sequence of downlink messages includes a second acquisition command for the remote node to transmit a second acquisition response; and
    receiving the first acquisition response to the first downlink message at the hub after sending the second downlink message from the hub.

33. The computer readable medium of claim 32, further storing instructions causing the computer to perform steps of:
    allocating time for a sequence of uplink frames from the remote node to the hub with the common time interval between the start of each uplink frame; and
    allocating time for at least one data communication time slot and at least one acquisition time slot within each uplink frame,
    wherein each downlink message includes a burst time plan instructing the remote node to transmit a data burst within the at least one data communication slot of a subsequent uplink frame and instructing the remote node to transmit an acquisition response within the at least one acquisition slot.

34. The computer readable medium of claim 33, wherein each burst time plan includes station keeping parameters for at least two remote nodes that are not yet acquired and the burst time plan instructs at least one of the at least two remote nodes to transmit a data burst or an acquisition response according to the station keeping parameters.

35. The computer readable medium of claim 34, wherein the station keeping parameters include at least one of a frequency, a symbol offset, and a power level.

36. A communication system comprising:
    a hub configured to send a first acquisition command to a remote node that is not yet acquired by the hub, said first acquisition command sent to acquire the remote node to be added to the communication system,
        instructing the remote node to send an acquisition response, and
        including a first frequency, said remote node configured to send a first acquisition response based on the first acquisition command to the hub using the first frequency, and said hub further configured to send a second acquisition command before receiving the first acquisition response, select a next acquisition remote node according to at least one of a round robin algorithm, a least recently used algorithm, and a priority algorithm, and select a next frequency based on an offset frequency of a previous acquisition command, wherein the second acquisition command identifies the next acquisition remote node for acquisition and includes the next frequency.

37. The system of claim 36, wherein the second acquisition command identifies the remote node or another remote node that is not yet acquired for acquisition and includes one of the first frequency and a second frequency.

38. The system of claim 36, wherein the hub is further configured to detect a symbol offset in the first response and send a symbol offset correction factor to the remote node, and the remote node is further configured to send a subsequent transmission to the hub using said correction factor to correct the detected symbol offset.

39. The system of claim 36, wherein the hub is further configured to send at least a third acquisition command to the remote node before receiving the first response.

40. The system of claim 36, wherein the hub is further configured to send the second acquisition command within a latency time of sending the first acquisition command, wherein the latency time is twice a time elapsed between sending a message from the hub and receiving the message at the remote node.

41. The system of claim 36, wherein the first frequency includes a frequency offset that informs the remote node to transmit a response based on a predetermined nominal remote transmit frequency and the frequency offset.

42. A synchronous satellite communication system comprising:

a hub configured to transmit a sequence of downlink messages to a remote node that is not yet acquired by the hub with a common time interval between the start of each downlink message, said common time interval being less than twice a time elapsed between sending one of the messages from the hub and receiving the one of the messages at the remote node, a first downlink message in the sequence including a first acquisition command to acquire the remote node to be added to the communication system and cause the remote node to transmit a first acquisition response, and a second downlink message immediately following the first downlink message in the sequence of downlink messages including a second acquisition command for the remote node to transmit a second acquisition response, wherein the first acquisition response to the first downlink message is received at the hub after sending the second downlink message from the hub.

43. The system of claim 42, wherein the hub is further configured to allocate time for a sequence of uplink frames from the remote node to the hub with the common time interval between the start of each uplink frame and allocate time for at least one data communication time slot and at least one acquisition time slot within each uplink frame, wherein each downlink message includes a burst time plan instructing the remote node to transmit a data burst within the at least one data communication slot of a subsequent uplink frame and instructing remote node to transmit an acquisition response within the at least one acquisition slot.

44. The system of claim 43, wherein each burst time plan includes station keeping parameters for at least two remote nodes and the burst time plan instructs at least one of the at least two remote nodes to transmit a data burst or an acquisition response according to the station keeping parameters.

45. The system of claim 44, wherein the station keeping parameters include at least one of a frequency, a symbol offset, and a power level.

* * * * *